May 18, 1954 L. W. IMM 2,678,772

COMPUTER

Filed March 14, 1949 2 Sheets-Sheet 1

INVENTOR.
LEWIS W. IMM

BY

Naylor and Lassagne

ATTORNEYS

May 18, 1954 L. W. IMM 2,678,772

COMPUTER

Filed March 14, 1949 2 Sheets-Sheet 2

INVENTOR.
LEWIS W. IMM

BY [signature]

ATTORNEYS

Patented May 18, 1954 2,678,772

UNITED STATES PATENT OFFICE 2,678,772

COMPUTER

Lewis W. Imm, Pacoima, Calif., assignor to Librascope, Incorporated, Burbank, Calif., a corporation of California Application March 14, 1949, Serial No. 81,339

9 Claims. (Cl. 235—61)

Figure 1:
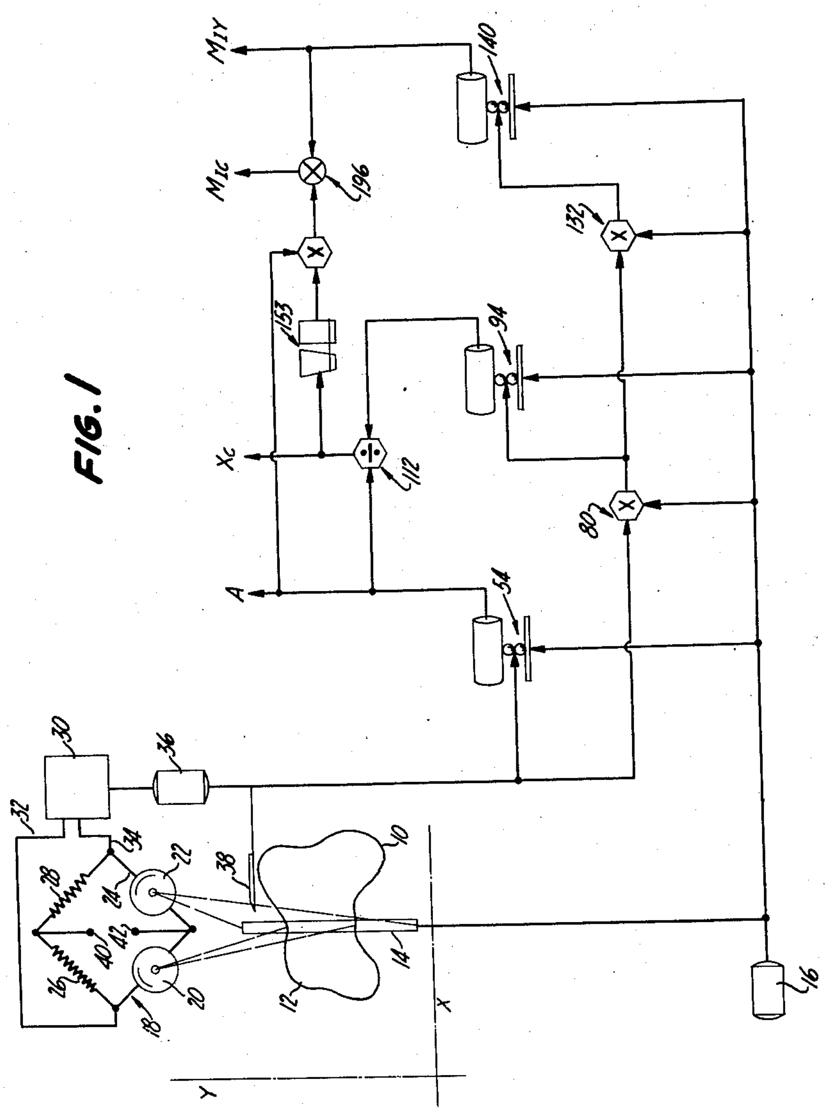

The present invention relates to computing mechanisms and particularly to a novel computer for deriving from progressively changing input data capable of representation by one or more mathematical curves, an output or outputs representative of simple or weighted functions of such curve or curves.

The simplest form of problem which computers embodying the present invention are designed to solve is that of determining the magnitude of an area bounded in whole or in part by a curve; examples of which are graphical representations of data in which the representative curve defines an area bounded on two sides by rectilinear X and Y axes, and map areas in which all sides may be bonded by curves.

Weighting of the data represented by the curve dealt with introduces complications into the problem varying in degree according to whether such weighting is effected according to (1) a constant value, (2) progressively changing values capable of representation by a second curve, or (3) changing values which are functions of the progressively changing values represented by the single curve being dealt with. Weighting by a constant value involves no substantial complication, but weighting in accordance with either a second curve or in accordance with a function of the primary curve involves problems of computer design which it is a primary object of the present invention to solve.

Specific applications for computers embodying the present invention are many and various; including, in the category presenting computations in which data represented by the primary input curve must be weighted in accordance with a second curve, (1) geophysical and marine exploration apparatus, in which a primary curve constructed from data representing a series of time intervals between transmission of sound impulses and receipt of echoes must be weighted in accordance with a curve representative of varying rates of sound transmission in different media or the same media at different temperatures; and (2) tristimulus computers, in which a primary curve constructed from data representing percentages of light reflection at progressively differing wavelengths must be weighted in accordance with a curve representative of varying retinal sensitivity to various wavelengths. Included in the category presenting computations in which data represented by the primary input curve must be weighted in accordance with a function of the primary curve itself are (1) centroid computers, in which the determination of the location of the centroid of an area bounded in whole or in part by a curve requires such weighting, as hereinafter described; (2) computers for determining any other desired properties of the area bounded by the primary curve. This enumeration of specific applications is not, of course, exhaustive and is intended to supply only examples of applications of computers embodying various novel features of the present invention.

Computations of the character described are performed, according to the present invention, by combinations including a series of integrating devices having a common input and each provided with a second input under the joint control of the common input and a weighting value input, which latter may be either a value derived from another curve or a value which is a function of the primary input curve.

In the embodiment illustrated and described in this specification, however, the arrangement is one in which the weighting value input is a function of the primary input curve, since it will be clear to those skilled in the art that modification of this arrangement to provide for weighting by a separate curve involves merely the omission of parts.

Figure 2:
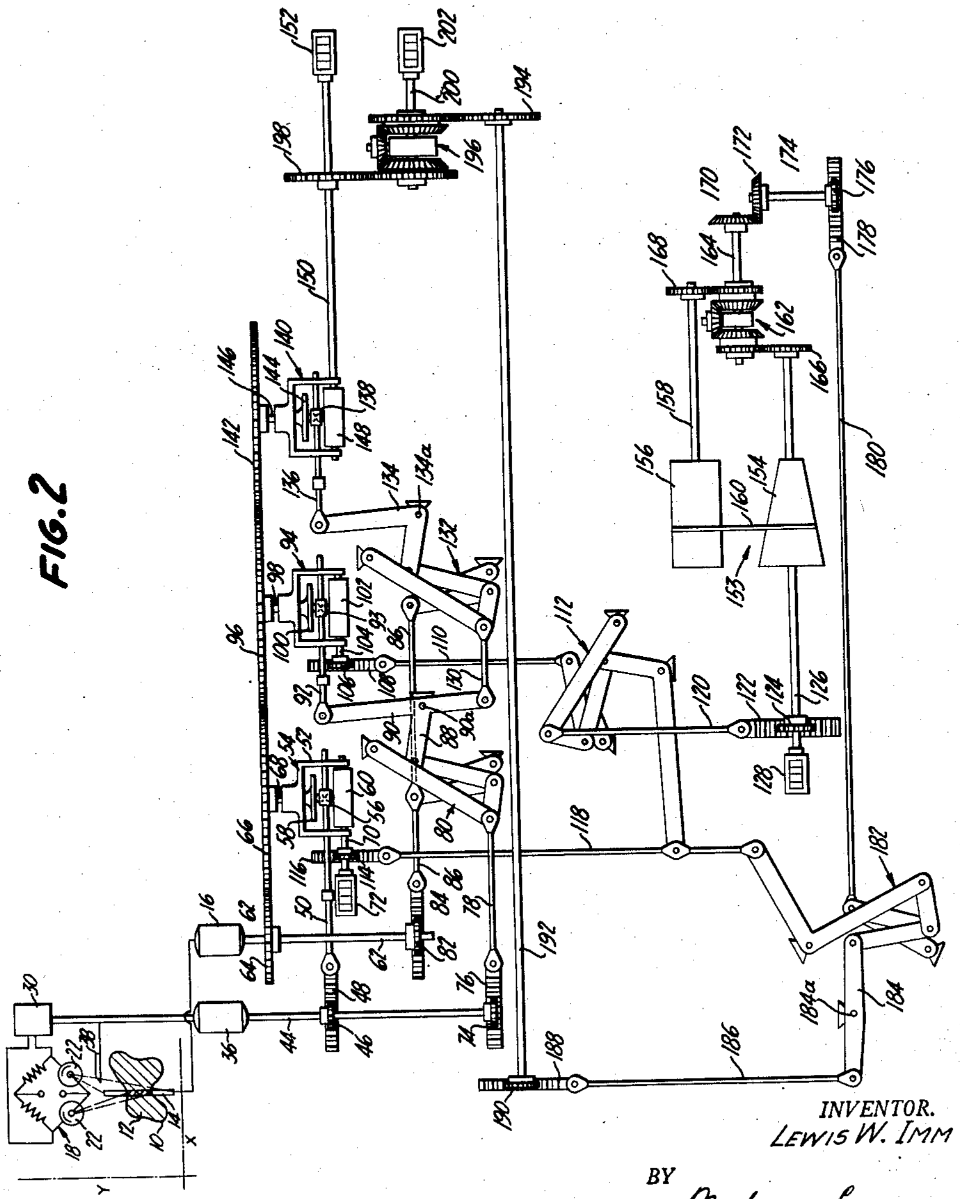

Additional objects and advantages of the invention will be apparent from the following description taken in conjunction with the drawings forming part of this specification, and in which:

Figure 1 is a schematic diagram of an embodiment of the computing device of the invention; and Figure 2 is a view showing the essential structural details of the computing device of Figure 1.

Referring to the drawings for more specific details of the invention, and with immediate reference to the functional-schematic view of Figure 1, 10 indicates a closed curve located in a certain relation to coordinate axes X and Y and enclosing an irregular area 12, various properties of which it is desired to ascertain. For example it is desired that the numerical units of area enclosed by the curve 10 be ascertained, and that the centroid, the moment of inertia about the centroid, and the moment of inertia about the Y axis of the area be also determined, preferably simultaneously. To achieve this purpose, it is necessary that some form of scanning means be provided so that certain instantaneous components of the area will be continuously furnished during the scanning operation. As a scanning means for irregular curves, such as 10, where neither of the coordinate axes forms a boundary of the enclosed area, I prefer to use a pair of balanced light sources, not shown, a scanning slit 14 driven at a constant speed across the area along the X axis, as by a motor 16, a photoelectric bridge indicated generally at 18 and comprising a pair of photoelectric cells 20 and 22 located in balancing relation in bridge circuit 24 to resistors 26 and 28, an amplifier 30 connected to circuit 24 by leads 32 and 34, a "servo" motor 36 driven by unbalance of the circuit 24 in a direction tending to correct this unbalance, and a shutter 38 driven by the motor 36 and operative to restrict the amount of light received by cell 22 to that received by cell 20, as will hereinafter more clearly appear. A source of electrical excitation is adapted to be connected across points 40 and 42 of the circuit 24.

The area 12 may be represented by a cut-out in a sheet of paper, or the like, fixed in relation to the coordinate axes X and Y, although the area may be represented in any manner in which it can be photoelectrically distinguished. The light sources, not shown, and the cells 20 and 22 are so arranged that cell 20 receives only that amount of light which will pass through the instantaneous mutually inclusive portions of slit 14 and area 12, while cell 22 is capable of receiving all the light passing through slit 14.

It will be appreciated that when motor 16 is actuated to drive the slit in scanning movement along axis X, no light will be received by cell 20 until the slit coincides with area 12, but that meanwhile light has impinged on cell 22, causing unbalance of bridge circuit 24 and actuation of motor 36 through amplifier 30 to close shutter 38 and balance the bridge circuit. As soon as the slit 14 in its scanning movement coincides with the area 12, light is received by cell 20, causing actuation of motor 36 and an opening of shutter 38 to allow cell 22 to receive the same amount of light. In this manner, motor 36 is continuously actuated in one direction or the other to cause the shutter to balance the incident light of cell 22 with that of cell 20, and since the light received by cell 20 is proportional to the instantaneous magnitude of the segment of area being scanned, the output of motor 36 is proportional to this instantaneous element of the area, which may be considered to be $Y_2-Y_1$.

Referring particularly to Figure 2, this instantaneous area element, $Y_2-Y_1$, is continuously fed through shaft 44, driven by motor 36, and gear 46, fixedly carried by said shaft, to a rack 48 in mesh with gear 46. The rack is connected to a rod 50 extending into the housing 52 of an integrator 54 and secured to a ball carrier 56, the opposed contacting balls of which serve as a driving connection between the disk 58 and cylinder 60 of the integrator 54. Meanwhile, the instantaneous value of X is fed to the disk 58 through motor 16, shaft 62 driven thereby, gear 64 carried by shaft 62, gear 66 in mesh with gear 64, and shaft 68 mounting gear 66 at one end and disk 58 at the other end, and being journalled for rotation in housing 52. The disk 58 in rotating through the range of $X_2-X_1$ drives cylinder 60 through the balls of the ball carrier 56, which, as has been seen, is being continuously reset to the instantaneous value of $Y_2-Y_1$, with the result that the output of cylinder 60 through shaft 70 to counter 72 is equal to the following: $\int(Y_2-Y_1)dX$, between the limits of $X_2$ and $X_1$. The value of this summation is equal to the numerical value of the area 12 when the scanning operation is completed, with the result that the value of the area may be directly read from counter 72.

As the area value is being summed up and transmitted to the counter 72, other properties of the area 12 are being simultaneously ascertained. The determination of such other properties is accomplished by weighting the value of the area in accordance with the coordinate values of another curve, which may be either an empirical curve or a curve representing a function of the curve with respect to which the determination of area is being made. In the embodiment illustrated, the weighting curve is of the latter class and curves representing different functions of the area being determined are employed for weighting purposes to determine the centroid and the moment of inertia about the Y axis.

The centroid of the area, which is a line parallel to the Y axis and passing through the center of gravity of the area, is determined with the following mechanism in the following manner. Shaft 44 through gear 74 fixed to the shaft, rack 76 in mesh with the gear, and rod 78 connected to the rack feeds the value $Y_2-Y_1$ into one side of a scissors multiplier linkage indicated generally at 80, and which may be of the type described in Imm Patent No. 2,394,180. Shaft 62 through gear 82 fixed thereto, rack 84 in mesh with the gear, and rod 86 connected to the rack feeds the value X into the other side of the multiplier linkage 80, with the result that the multiplier output, $X(Y_2-Y_1)$, is transmitted to arm 88 of first class lever 90 fulcrumed at 90*a*, and from one end of lever 90 to rod 92 having the ball carrier 93 of integrator 94 secured thereto. At the same time gear 66 is feeding X, or the change in X, to gear 96 carried by shaft 98 connected to the integrator disk 100. The conjoint movement of carrier 93 and disk 100 imparts an output to cylinder 102 equal to the following:

$$\int X(Y_2-Y_1)dX$$

between the limits of $X_2$ and $X_1$, the coordinate limits of X of the curve 10. For purposes of brevity this summation may be written as $\int XdA$ where $dA$ is the differential of the area 12. The value $\int XdA$ is fed by the output shaft 104 of cylinder 102 to gear 106 fixed thereto, and gear 106 actuates rack 108 and rod 110 connected thereto to feed this mentioned value into one side of a divider linkage indicated generally at 112 and corresponding in construction to the multiplier linkage previously described. The output of cylinder 60, which is the value of the area, or $\int dA$, is fed into the other side of divider linkage 112 through gear 114, rack 116 and rod 118. The divider linkage 112, therefore, divides the one input value $\int XdA$ by the other input value $\int dA$, and the resulting quotient is equal to the weighted value of X, or the centroid of the area 12, which may be denoted as $X_c$. $X_c$ is fed through the output side of the divider linkage 112 to rod 120 and rack 122 connected thereto, and rack 122 in mesh with gear 124 fixed on shaft 126 transmits the value of $X_c$ to counter 128, where it may be directly read at the conclusion of the scanning operation, in terms of linear measure from the margin of the area at which scanning was commenced.

Concurrently with the above-described operation, yet another property of the area is being determined, and this is the moment of inertia of the area 12 about the Y axis, or $M_{IY}$. This property is determined as follows: The lower end of lever 90 is connected to rod 130 which in turn is connected to one input side of another multiplier linkage indicated generally at 132. Rod 86, which feeds the instantaneous value of X into multiplier linkage 80, also feeds the same value into the other input side of multiplier linkage 132. Thus, the linkage 132 multiplies the value $X(Y_2-Y_1)$ by X, and the product $$X^2(Y_2-Y_1)$$

is fed to crank lever 134 fulcrumed at 134*a*, which, being connected to rod 136, transmits this value to the ball carrier 138 of an integrator indicated generally at 140. Gear 96 transmits the value of the change in X between limits $X_1$ and $X_2$ to gear 142 in mesh therewith, and integrator disk 144 is rotated in proportion to this value by shaft 146 connected to gear 142. The conjoint movement of disk 144 and ball carrier 138 results in an integration step, the output of cylinder 148 being equal to $\int X^2(Y_2-Y_1)\,dX$, or $\int X^2dA$, between the values of $X_2$ and $X_1$. The moment of inertia, $M_{IY}$, being equal to $\int X^2dA$, is thus fed by shaft 150 to counter 152 where it may be directly read at the conclusion of the scanning operation.

And yet another property of the area 12 is simultaneously obtained by the embodiment of the invention shown, and this property is the moment of inertia of the area 12 about the centroid $X_c$. The equation to be solved is $$M_{IC}=M_{IY}-X_c^2A$$

where $M_{IC}$ is the moment of inertia about the centroid; $M_{IY}$ is the moment of inertia about the Y axis; $X_c$ is the centroid; and A is the area. It will be remembered that rotation is imparted to shaft 126 proportional to the centroid of the area 12, or $X_c$. This value is squared through a squaring mechanism 153 comprising the following elements: a cone 154 carried by shaft 126; a cylinder 156 carried by shaft 158 and having a flexible drive connection 160 with the cone; and a differential indicated generally at 162 having an output shaft 164, this mechanism being described in detail in the copending Imm application Serial No. 508,231, filed October 29, 1943, now Pat. 2,485,200. The motion of shaft 126 is imparted to one side of the differential through gear 166, and the motion of shaft 158 is imparted to the other side of the differential through gear 168, with the result that rotation of output shaft 164 is equal to the difference in rotation between shafts 126 and 158, which difference is equal to the square of the centroid, or $X_c^2$. This value is transmitted through bevel gear 170 carried by shaft 164 to bevel gear 172 carried by shaft 174, and from gear 176 carried by shaft 174 to rack 178 in mesh with gear 176. Rack 178 through rod 180 connected therewith feeds the value $X_c^2$ into one side of another multiplier linkage indicated generally at 182. Meanwhile, rod 118 feeds the value of the area, or A, into the other side of multiplier linkage 182, and the linkage output, $X_c^2$ A, is transmitted to first class lever 184 fulcrumed at 184*a*, and from lever 184 to rod 186, rack 188, gear 190, shaft 192, and gear 194 to one input side of another differential mechanism indicated generally by 196. Motion of shaft 150, which, it will be remembered, is proportional to $M_{IY}$, or the moment of inertia of area 12 about the Y axis, is fed into the other side of differential 196 by gear 198. The output shaft 200 of the differential 196 is given a motion equal to the difference between the input values, or $$M_{IY}-X_c^2A$$

which difference is equal to $M_{IC}$, the moment of inertia of the area 12 about the centroid $X_c$. The shaft 200 actuates the counter 202 accordingly, with the result that the value of $M_{IC}$ may be read directly from the counter at the conclusion of the scanning operation.

It will be seen that the computing device of the present invention makes it possible for numerous properties of curve-bounded areas to be simultaneously entertained. Other properties of an area, such as the radius of gyration, which may be obtained by dividing the moment of inertia by the area through the simple provision of a divider linkage connected across the outputs of cylinders 68 and 148 and having its output side (with its movement amplified by servomotor, if desired) feeding another counter or similar indicator, can be solved for by slight modifications of the embodiment of the computing device shown.

It will be obvious that the computing device may be as readily used to ascertain the properties of areas defined by polar coordinates or other coordinate systems, and that arbitrary properties may be accorded the area defined by a curve, as by weighting the area in accordance with the coordinate values of another curve, such as a curve either representing a function of the data represented by the main curve or area, or data having its origin in sources independent of the data represented by the main curve.

It is to be further pointed out that various types of scanning means may be used to feed the instantaneous factorial values of the area to the device. For example, if the area-bounding curve is regular and bounded by a coordinate axis, a simple curve tracer could be used to feed the values of $dA$ to the computing mechanism, while if the curve is closed and irregular, a specific linkage arrangement may be provided to achieve a mechanical scanning, or a specially cut cam may be utilized for the same purpose.

The invention is, therefore, to be limited only by the scope of the appended claims.

What I claim as new and desire to secure by Letters Patent is:

1. In a computing device for the determination of properties of areas defined by curves, the combination of an integrator having disk, cylinder and ball elements, scanning means for an area defined by a curve having means producing an output motion proportional to the instantaneous value of the segment of area being scanned, means associated with said scanning means and having an output motion proportional to the rate of scanning, means for receiving the rate of scanning output motion from said scanning means and operable to transmit said output motion to the disk element of the integrator and to one input side of a multiplier unit, means for receiving the instantaneous value output motion from said scanning means and operable to transmit said motion to another input side of said multiplier unit, means interconnecting the output side of said multiplier unit and the ball elements of said integrator and operable to position said ball elements in accordance with the output motion of said unit, and means connected to the cylinder adapted to be actuated in proportion to the output motion of said cylinder.

2. In a computing device for the determination of properties of areas defined by curves, the combination of an integrator having disk, cylinder and ball elements, scanning means for an area defined by a curve having means producing an output motion proportional to the instantaneous value of the segment of area being scanned, means associated with said scanning means and having an output motion proportional to the rate of scanning, means for receiving the rate of scanning output motion from said actuating means and operable to transmit said output motion to the disk element of the integrator and to one input side of each of first and second multiplier units, means for receiving the instantaneous value output motion from said scanning means and operable to transmit said motion to another input side of said first multiplier unit, means interconnecting the output side of said first multiplier unit to another input side of said second multiplier unit and operable to transmit the motion of the former to the latter, means interconnecting the output side of the second multiplier unit with the ball elements of said integrator and operable to position said ball elements in accordance with the output motion of said unit, and means connected to the cylinder adapted to be actuated in proportion to the output motion of said cylinder.

3. In a computing device for the determination of properties of areas defined by curves, the combination of first and second integrators, each having disk, cylinder and ball elements, scanning means for an area defined by a curve having an output motion proportional to the instantaneous value of the segment of area being scanned, means for actuating said scanning means and having an output motion proportional to the rate of scanning, means for receiving the output motion from said actuating means and operable to transmit said output motion to the disk elements of each of said integrators and to an input of a multiplier unit, means for receiving the output motion from said scanning means and operable to transmit said output motion to the ball elements of said first integrator to position the same and to another input of said multiplier unit, means for receiving the output of said multiplier unit and operable to transmit said output to the ball elements of said second integrator to position the same, a divider unit having the two input sides thereof connected, respectively, to the cylinders of the first and second integrators and being adapted to receive the output motions of said cylinders, a first counter to receive the output motion of said first integrator cylinder, and a second counter to receive the output motion of said divider unit.

4. In a computing device for the determination of properties of areas defined by curves, the combination of first and second integrators, each having disk, cylinder and ball elements, scanning means for an area defined by a curve having means producing an output motion proportional to the instantaneous value of the segment of area being scanned, means for actuating said scanning means and having an output motion proportional to the rate of scanning, means for receiving the output motion from said actuating means and operable to transmit said output motion to the disk elements of each of said integrators and to the input sides of each of first and second multiplier units, means for receiving the output motion from said scanning means and operable to transmit said output motion to another input side of said first multiplier unit, means connected to the output side of said first multiplier and operable to transmit the output motion thereof to the ball elements of said first integrator to position the same and to another input side of said second multiplier unit, means connected between the output side of said second multiplier unit and the ball elements of said second integrator to position the latter in accordance with the output motion of said unit, means connected to the cylinder of said first integrator for receiving the output motion thereof, and means connected to the cylinder of said second integrator for receiving the output motion thereof.

5. In a computing device for the determination of properties of areas defined by curves, the combination of first and second integrators, each having disk, cylinder and ball elements, scanning means for an area defined by a curve having means producing an output motion proportional to the instantaneous value of the segment of area being scanned, means for actuating said scanning means and having an output motion proportional to the rate of scanning, means for receiving the output motion from said actuating means and operable to transmit said output motion to the disk elements of each of said integrators and to the input sides of each of first and second multiplier units, means for receiving the output motion from said scanning means and operable to transmit said output motion to the ball elements of said first integrator to position the same and to another input side of said first multiplier unit, means for transmitting the motion of the output side of said first multiplier unit to another input side of said second multiplier unit, means interconnecting the output side of said second multiplier unit and the ball elements of said second integrator and adapted to position said ball elements in accordance with the motion of the output side of said second multiplier unit, means connected to the cylinder of said first integrator for receiving the output motion thereof, and means connected to the cylinder of said second integrator for receiving the output motion thereof.

6. In a computing device for the determination of properties of areas defined by curves, the combination of first, second and third integrators, each having disk, cylinder and ball elements, scanning means for an area defined by a curve having an output motion proportional to the instantaneous value of the segment of area being scanned, means for actuating said scanning means and having an output motion proportional to the rate of scanning, means for receiving the output motion from said actuating means and operable to transmit said output motion to the disk elements of each of said integrators and to inputs of first and second multiplier units, means for receiving the output motion from said scanning means and operable to transmit said output motion to the ball elements of said first integrator to position the same and to another input of said first multiplier unit, means for receiving the output of said first multiplier unit and operable to transmit said output to the ball elements of said second integrator to position the same and to another input of said second multiplier unit, means interconnecting the second multiplier unit with the ball elements of the third integrator and operable to position said ball elements in proportion to the output of said second multiplier unit, a first counter for receiving the output motion of the cylinder of said first integrator, a divider unit for receiving the same output motion and also the output motion of the cylinder of said second integrator, a second counter for receiving the output motion of said divider unit, a value squaring mechanism to receive the output motion of said divider unit and adapted to transmit its output motion to an input side of a third multiplier unit, the other input side of said multiplier unit being adapted to receive the output motion of said first integrator cylinder, a differential mechanism for receiving the output motions of said third multiplier unit and said third integrator cylinder, and third and fourth counters for receiving, respectively, the output motions of said differential mechanism and said third integrator cylinder.

7. In a computing device for the determination of properties of areas defined by curves, the combination of first, second and third integrators, each having disk, cylinder and ball elements, scanning means for an area defined by a curve having an output motion proportional to the instantaneous value of the segment of area being scanned, means for actuating said scanning means and having an output motion proportional to the rate of scanning, means for receiving the output motion from said actuating means and operable to transmit said output motion to the disk elements of each of said integrators and to inputs of first and second multiplier units, means for receiving the output motion from said scanning means and operable to transmit said output motion to the ball elements of said first integrator to position the same and to another input of said first multiplier unit, means for receiving the output of said first multiplier unit and operable to transmit said output to the ball elements of said second integrator to position the same and to another input of said second multiplier unit, means interconnecting the second multiplier unit with the ball elements of the third integrator and operable to position said ball elements in proportion to the output of said second multiplier unit, a first counter for receiving the output motion of the cylinder of said first integrator, a divider unit for receiving the same output motion and also the output motion of the cylinder of said second integrator, a second counter for receiving the output motion of said divider unit, and a third counter for receiving the output motion of said third integrator cylinder.

8. In a computing device of the character described, an integrating device having a first input means and a second input means, and actuating mechanism for said second input means comprising a three-element scissor type multiplying linkage having a first element adjustable in a synchronized relationship with said first input means, a second element adjustable to represent a weighting value, and a third element jointly controlled by said first and second elements and having an operating connection with said second input means.

9. In a computing device of the character described, an integrating device having a disk, a cylinder, and adjustable ball means between said disk and said cylinder; means for driving the disk of said integrating device, and mechanism for adjusting the ball means of said integrating device comprising a three element scissor type multiplying linkage having a first element adjustable in a synchronized relationship with the driving means for the disk in said integrating device, a second element adjustable to represent a weighting value, and a third element jointly controlled by said first and second elements and having an operating connection with said ball means.

References Cited in the file of this patent

UNITED STATES PATENTS

| Number | Name | Date |
|---|---|---|
| 1,875,019 | Koeppen, Jr. | Aug. 30, 1932 |
| 2,044,164 | Gulliksen | June 16, 1936 |
| 2,066,934 | Gulliksen | Jan. 5, 1937 |
| 2,199,769 | Woolley | May 7, 1940 |
| 2,206,875 | Chafee et al. | July 9, 1940 |
| 2,397,467 | Bush et al. | Apr. 2, 1946 |

FOREIGN PATENTS

| Number | Country | Date |
|---|---|---|
| 548,093 | Great Britain | Sept. 24, 1942 |